C., E. R., C. C., AND E. C. HEIM.
COMBINED FEEDER AND HIVE VENTILATOR.
APPLICATION FILED JAN. 29, 1921.
1,435,118.
Patented Nov. 7, 1922.
3 SHEETS—SHEET 3.
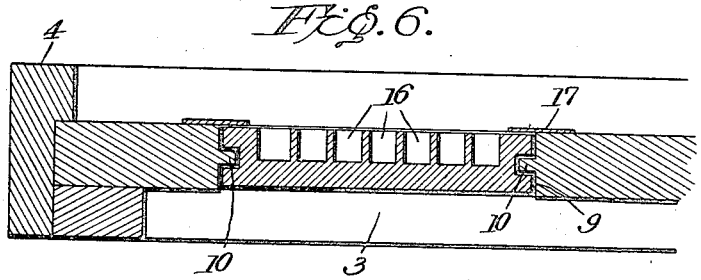
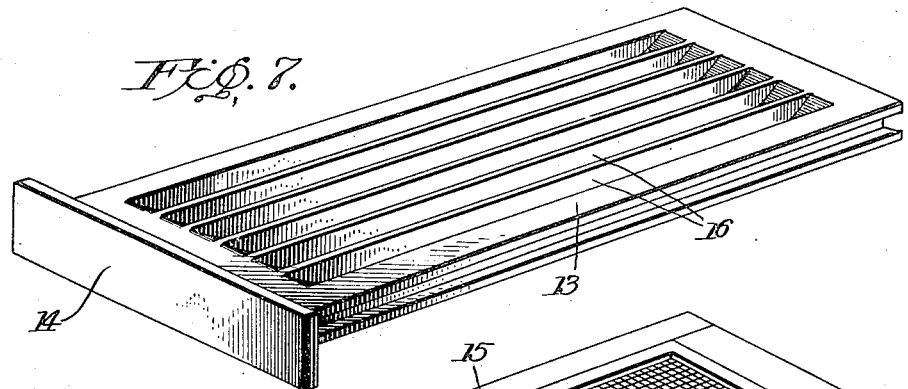
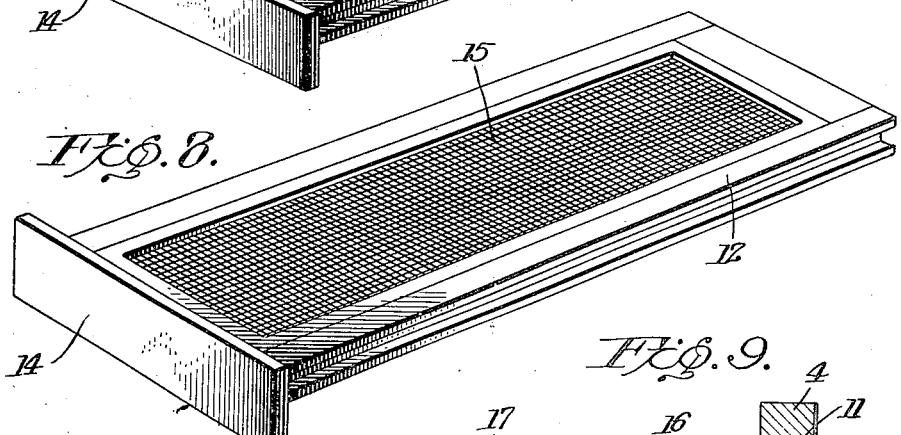
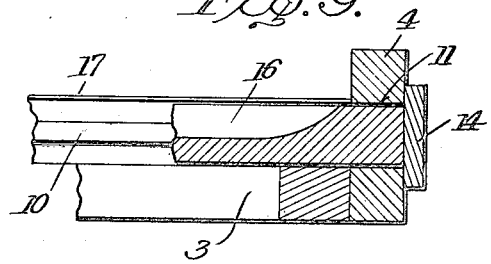
Charles Heim,
Emil R. Heim,
Clarence C. Heim,
Edwin C. Heim,
INVENTOR
BY Victor J. Evans
ATTORNEY Patented Nov. 7, 1922.

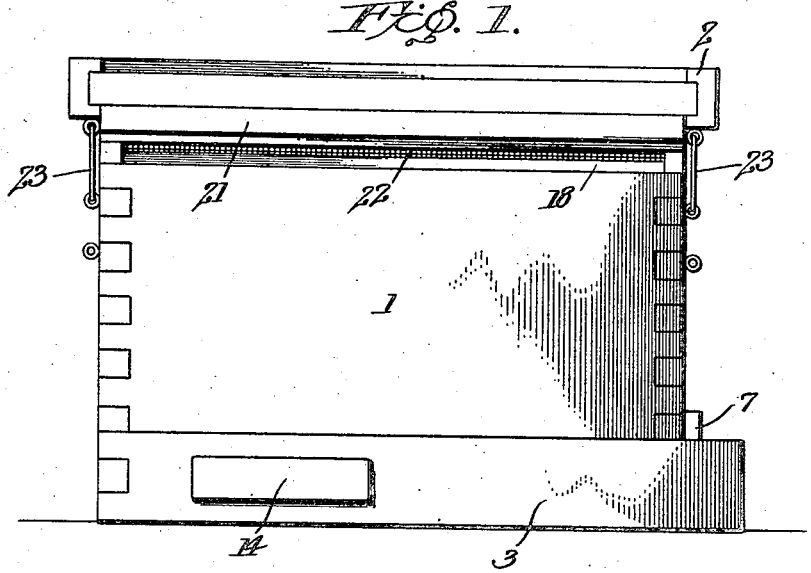
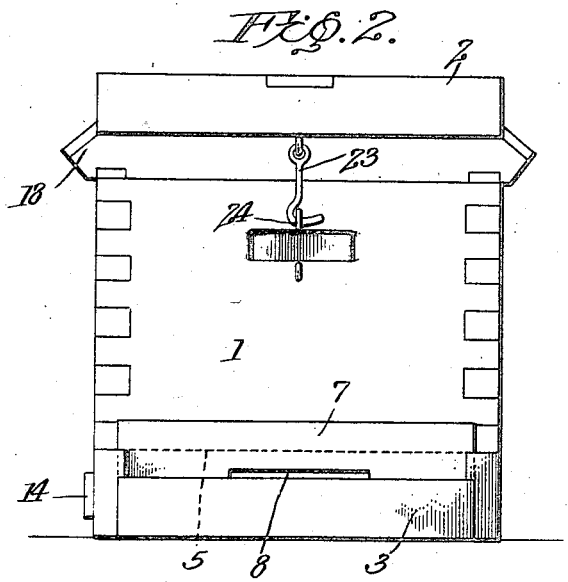

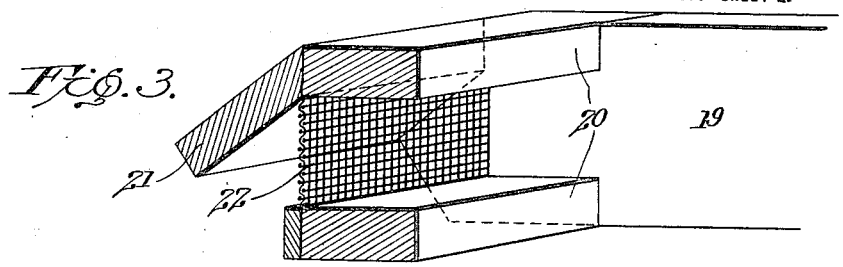
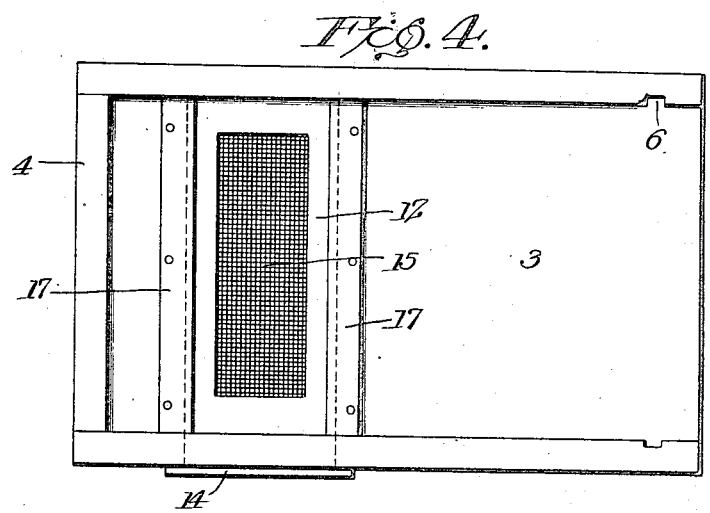
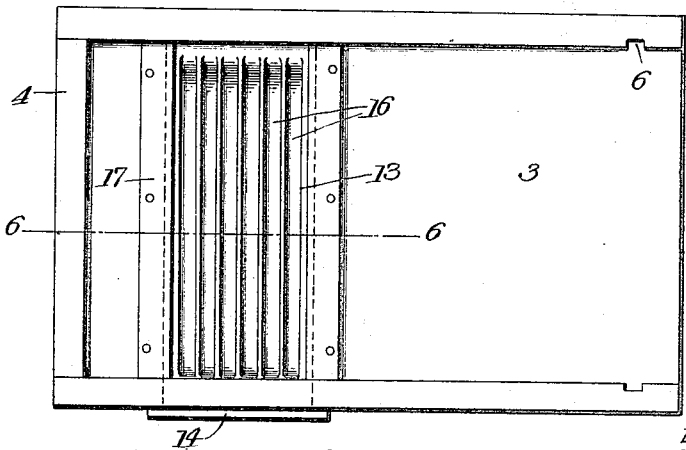

1,435,118

UNITED STATES PATENT OFFICE.

CHARLES HEIM, EMIL R. HEIM, CLARENCE C. HEIM, AND EDWIN C. HEIM, OF THREE RIVERS, TEXAS.

COMBINED FEEDER AND HIVE VENTILATOR.

Application filed January 29, 1921. Serial No. 441,024.

*To all whom it may concern:*

Be it known that we, CHARLES HEIM, EMIL R. HEIM, CLARENCE C. HEIM, and EDWIN C. HEIM, citizens of the United States, residing at Three Rivers, in the county of Live Oak and State of Texas, have invented new and useful Improvements in Combined Feeders and Hive Ventilators, of which the following is a specification.

This invention relates to improvements in bee-hives, the principal object of the invention being to provide ventilating means whereby the hive can be ventilated during warm weather.

Another object of the invention is to provide means whereby the ventilating means can be removed or rendered inoperative whenever desired or during cold weather.

A further object of the invention is to provide means whereby liquid feed or the like can be easily placed in the hive without disturbing the bees and without attracting the bees from other hives.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a side view of a hive constructed in accordance with our invention.

Figure 2 is a front view of the improved hive.

Figure 3 is a view partly in section of the upper ventilating device.

Figure 4 is a view of the bottom board of the hive showing the ventilator device in position.

Figure 5 is a similar view but showing the feeding device substituted for the ventilating device.

Figure 6 is a section on line 6—6 of Figure 5.

Figure 7 is a view of the feeding device.

Figure 8 is a view of the lower screen device.

Figure 9 is a view of the block for limiting the entrance opening.

In these views 1 indicates the body of the hive, 2 the top thereof and 3 the bottom. This bottom is well reinforced, as shown in Figure 9. The sides and rear end of the bottom extend upwardly to form flanges 4 upon which the body rests, this flange being omitted at the front to provide the entrance opening 5. The side flanges are provided with notches 6 for receiving the block 7 for limiting the entrance opening when desired. This block is provided with the slot 8 through which the bees pass when the block is being used. An opening 9 is formed in the bottom adjacent the rear thereof, the side walls of which are provided with the tongues 10 and one side of the bottom is provided with the slot 11 which forms a continuation of the opening. This opening is adapted to receive either the ventilator 12 or the feeder 13. Both of these devices are made to pass through the slot 11 into said opening and snugly fit therein, each device being provided with grooved side edges to engage the tongues 10. Each device is also provided with a head 14 for engaging the side wall around slot 11. The ventilator 12 consists of a frame carrying a strip 15 of wire gauze or the like so that air can pass into the hive through the bottom, the wire gauze preventing insects and the like from entering the hive. The feeder 13 is provided with a plurality of grooves 16 for containing the liquid feed. The other face of the feeder is plain so that when it is not necessary to feed the bees this plain face may be placed uppermost in the bottom with the grooved face downwardly.

In order to prevent the bees from gluing either the ventilator or the feeder to the bottom we provide metal strips 17 above the tongued side walls of the opening, these strips overlapping the feeder or ventilator and thus preventing the bees from placing the adhesive material in the spaces between the feeder or ventilator and the walls of the opening.

The upper ventilator 18 is placed on top of the body of the hive with the top resting thereon. This upper ventilator consists of a frame formed of the end pieces 19, two pairs of connecting pieces 20 and the inclined pieces 21. Each end piece is provided with ridged ends and the side pieces 20 are mortised to the end pieces adjacent said ridged ends, one side piece of each pair being arranged at the top of the end pieces and the other side piece being arranged at the bottom of the end pieces so that a space is left between the side pieces. The inclined pieces 21 are secured to the upper inclined edges at the ends of the end pieces and abut the top side pieces. Strips 22 of wire gauze or the like are stretched between each pair of side pieces. The ridged ends of the end pieces project beyond the body of the hive when in place and each inclined piece forms a roof for preventing rain from entering the space between the side pieces. The top 2 may be provided with hooks 23 which are adapted to engage eyes 24 on the body, a pair of these eyes being arranged at each end of the body and so placed that the top can be hooked on to the body when the ventilator 18 is being used as well as when said ventilator is not being used.

From the above it will be apparent that when both ventilators are in place a free circulation of air through the hive is provided, the screens in said ventilators preventing the entrance of insects and the like through the ventilating spaces. The arrangement of the inclined pieces at the side edges of the upper ventilator acts to shed the water from the roof and prevent it or rain from entering the ventilating openings.

When the bees are to be fed it is simply necessary to partly withdraw the feeder from the side of the bottom and place the feeding material in the grooves therein. Then the feeder is pushed back so that the bees can get at the material. The feeding material is located wholly within the hive so that robber bees are not attracted thereby and if they should enter at the entrance opening the block 7 may be put in place to restrict this opening.

When the honey flow is light, bees are very much inclined to rob from each other when one begins to take off honey from the hive; and also when empty extracted supers are being placed back on hive, that also creates anger and a robbing fever amongst bees. The robber bees will work with the greatest effort to find their way into every hive that is unable to protect their entrance. The top ventilator will draw all the robber bees away from the entrance and encourage them to the top of the hive. So they keep clustering on the ventilator screen, and continually falling down in clusters on the side of the hive, until they get discouraged and fully convinced that there is nothing for them to get.

It is thought from the foregoing description that the advantages and novel features of the invention will be readily apparent.

We desire it to be understood that we may make changes in the construction and in the combination and arrangement of the several parts, provided that such changes fall within the scope of the appended claims.

What we claim is:—

1. A hive of the class described comprising a bottom having a ventilating opening therein, a removable screen carrying member for closing said opening, a solid member adapted to be substituted for the screen carrying member and a ventilating frame provided with screened openings and located between the body of the hive and the top thereof.

2. A bee hive of the class described comprising a reinforced bottom having the sides and rear end thereof extending upwardly to provide a flange, a body resting upon said flange and an entrance opening formed in the front of the device, the side flanges having notches formed therein and a block arranged therein for limiting the entrance opening, said block has a slot through which the bees pass, the bottom has an opening therein adjacent the rear thereof, tongues being provided on the side walls and one side of the body having a slot which forms a continuation of said opening, a ventilator and feeder of a size capable of insertion in said opening and having grooved side edges to engage said tongues, a head provided on each device for engaging the side wall around the slot means provided on the ventilator or feeder to prevent the bees from gluing said device.

In testimony whereof we affix our signatures.

CHARLES HEIM.
EMIL H. HEIM.
CLARENCE C. HEIM.
EDWIN C. HEIM.